April 5, 1932.                F. PALMER                1,852,127
                           ELECTRIC CABLE
                          Filed Jan. 9, 1929
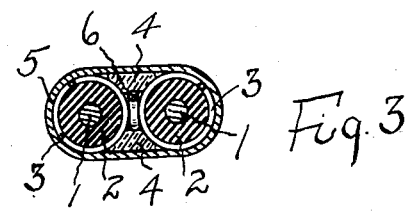
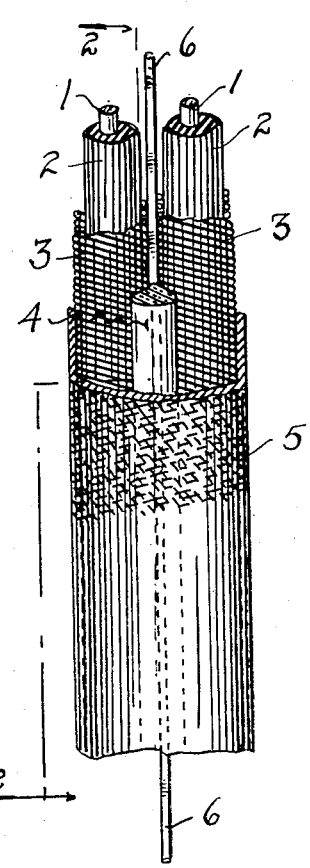
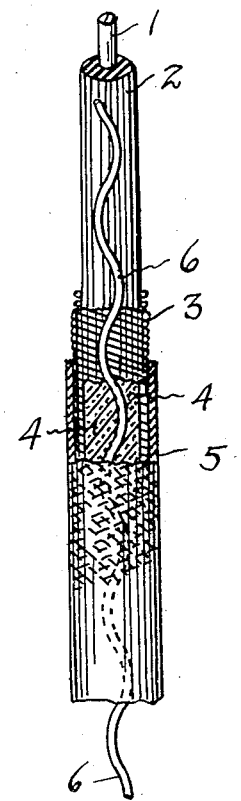
Inventor
Frederick Palmer
By his Attorneys Darby & Darby Patented Apr. 5, 1932

1,852,127

UNITED STATES PATENT OFFICE

FREDERICK PALMER, OF BROOKLYN, NEW YORK, ASSIGNOR TO TRIANGLE CONDUIT COMPANY, INC., OF BROOKLYN, NEW YORK, A CORPORATION OF NEW YORK

ELECTRIC CABLE

Application filed January 9, 1929. Serial No. 331,190.

This invention relates in general to non-metallic sheathed electric conductors.

One of the objects of this invention is the provision in a cable of this nature of a special form of conductor lying between insulation on the current carrying wires.

A further object of this invention is the provision of this special form of conductor made in a crimped or serpentine shape.

A further object of this invention involves the employment of a conductor of this type within a non-metallic sheathed cable which does not tend to wear through and break the sheathing when the cable is bent.

These and other objects, as will appear from the following disclosure, are secured by means of this invention.

This invention resides substantially in the combination, construction, arrangement, and relative location of parts, all as will be disclosed in greater detail below.

Referring to the drawings—

Fig. 1 is an elevational view of a cable embodying this invention with the various parts broken away;

Fig. 2 is a cross sectional view taken on the line 2—2 of Fig. 1; and

Fig. 3 is a cross sectional view through the cable employing the principles of this invention.

It is now required that non-metallic sheathed electric cables be provided with a bare copper wire lying below the sheathing for effecting grounding as a safety feature should a short-circuit occur. When this requirement was first made it was generally believed that a bare copper wire in the assembly would meet this requirement and yet provide a cable which would be rugged and which would stand up in the normal use and handling to which it would be subjected. On experiment it was found, however, that merely including a bare copper wire adjacent to or between the conductors within the outer sheathing would not be satisfactory. Such a cable on being bent several times would cause the bare copper wire to ripple up and at times break through the outer sheathing causing a rupture in the entire assembly and making the cable uncommercial. The purpose of this invention is to overcome this difficulty and it has been found that if a crimped or serpentine bare copper wire be placed between the conductors within the sheathing the cable can be readily bent as often as desired without causing a displacement of the elements of the cable and without causing a rupture of the insulation and sheathing.

To better understand this invention reference will now be made to the drawings.

The invention has been disclosed as applied to a two-conductor electric cable but it is not, of course, necessarily limited to this form. The two current carrying conductors are shown at 1 encased within insulating walls 2 which may be of rubber and paper. In fact the particular type of insulation applied to these wires is not material to the features of this invention. The layers 2 are enclosed within a spiral wrapping of a suitable impregnated insulating material such as, for instance, jute cords. This, again, is not an essential feature of the invention but is given in order to carry out the complete disclosure of one practical form of cable to which the invention has been applied. Normally these two current wires with their insulation are placed parallel to each other in contact along a line and the spaces on each side formed by the curved surfaces of the insulation are filled in by means of jute fillers shown at 4. These parts are all pressed firmly together and covered by means of a woven fabric sheathing and the whole assembly impregnated with a suitable insulating compound and compressed to provide a cable of the general form shown in Fig. 3. This invention involves employing a bare copper wire, shown at 6, in crimped or serpentine form. Best results are secured by placing this bare copper wire between the two insulated current wires 1 so that the plane thereof lies in the tangent plane at the line of contact. The jute fillers are then forced into place as before so as to enclose the bare copper conductor, as will be clear from Fig. 2. By placing the bare copper wire in the position described, which position is clearly shown in the drawings, it is found that the cable may be readily bent and twisted as desired and as normally encountered in using such a cable without causing the bare conductor to ripple, move out of place, and break through the insulation of the conductors or the outer sheathing. A cable constructed in this form meets all the code requirements and at the same time meets all the practical conditions which it will normally encounter without reducing the life or efficiency of the cable.

From the foregoing disclosure it will be apparent that I have embodied certain principles of construction in a physical form for purposes of illustration. Those skilled in the art, however, will readily appreciate other forms which the device may take without departing from these principles and I do not, therefore, desire to be strictly limited to the illustrative embodiment of the invention but rather to the scope of the appended claim. As an example of one variation, it is apparent that the outer crimped conductor 6 might be placed under the outer sheathing.

What I seek to secure by United States Letters Patent is:

The combination comprising a plurality of insulated electric conductors, a crimped bare conductor lying between them so that the axis of the crimped conductor lies in the plane of the axes of the insulated conductors, fillers overlying said bare conductor and filling the space formed by the contour of the insulated electric conductors and a flexible non-metallic sheathing over all of said elements.

In testimony whereof I have hereunto set my hand on this 5th day of January, A. D., 1929.

FREDERICK PALMER.